(12) United States Patent
Good et al.

(10) Patent No.: US 6,985,825 B1
(45) Date of Patent: Jan. 10, 2006

(54) METHOD AND APPARATUS FOR ADAPTIVE SAMPLING BASED ON PROCESS COVARIANCE

(75) Inventors: Richard P. Good, Austin, TX (US); Timothy L. Jackson, Pflugerville, TX (US); Brian K. Cusson, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 272 days.

(21) Appl. No.: 10/619,843

(22) Filed: Jul. 15, 2003

(51) Int. Cl.
*G06F 19/00* (2006.01)
*G01N 37/00* (2006.01)

(52) U.S. Cl. ........................................ 702/83; 700/108
(58) Field of Classification Search ........ 700/108–110, 700/121; 702/81–84, 182
See application file for complete search history.

(56) References Cited

U.S. PATENT DOCUMENTS

| | | | |
|---|---|---|---|
| 6,650,955 B1 * | 11/2003 | Sonderman et al. | 700/108 |
| 6,738,682 B1 * | 5/2004 | Pasadyn | 700/100 |
| 6,766,214 B1 * | 7/2004 | Wang et al. | 700/121 |
| 6,821,792 B1 * | 11/2004 | Sonderman et al. | 438/5 |
| 6,920,405 B2 * | 7/2005 | Lawrence | 702/83 |
| 2004/0073534 A1 * | 4/2004 | Robson | 707/1 |

* cited by examiner

*Primary Examiner*—Albert W. Paladini
*Assistant Examiner*—Ryan Jarrett
(74) *Attorney, Agent, or Firm*—Williams, Morgan & Amerson

(57) ABSTRACT

A method includes processing a plurality of workpieces to form at least one feature on each workpiece. A plurality of characteristics of the feature is measured. A covariance matrix including diagonal and non-diagonal terms for the plurality of characteristics measured is constructed. At least the non-diagonal terms of the covariance matrix are monitored. A sampling plan for measuring the workpieces is determined based on the monitoring. A system includes a plurality of tools, at least one metrology tool, and a sampling controller. The tools are configured to process a plurality of workpieces to form at least one feature on each workpiece. The metrology tool is configured to measure a plurality of characteristics of the feature. The sampling controller is configured to construct a covariance matrix including diagonal and non-diagonal terms for the plurality of characteristics measured, monitor at least the non-diagonal terms of the covariance matrix, and determine a sampling plan for measuring the workpieces based on the monitoring.

21 Claims, 2 Drawing Sheets

METHOD AND APPARATUS FOR ADAPTIVE SAMPLING BASED ON PROCESS COVARIANCE

BACKGROUND OF THE INVENTION

1. Field of the Invention

This invention relates generally to an industrial process, and, more particularly, to a method and apparatus for adaptive sampling based on process covariance in a semiconductor manufacturing environment.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

Data gathered during the course of wafer processing is used to identify and attempt to mitigate the effects of process and equipment variations by implementing automatic control techniques based on the collected feedback. Current semiconductor processing techniques typically collect metrology data at a fixed rate (e.g., every fourth lot processed in a tool) or by pre-assigning a fixed percentage of lots for measurement. Because lots are not typically processed in a particular order, the percentage technique sometimes results in periods where multiple lots are measured consecutively, followed by periods where no lots are measured. Such static sampling plans sometimes do not diagnose process or system issues expeditiously. As a result defective wafers could be manufactured, necessitating costly re-work or scrapping of the wafers.

Static sampling plans also sometimes fail to provide adequate data for effective process control. For a fluctuating process, the sampling frequency may not be sufficient to provide adequate feedback for implementing a control methodology for reducing the variation. On the other hand, for a stable process, a static sampling plan may result in the collection of more data than is required, thus reducing the efficiency of the fabrication process. For a stable process, few control actions are typically taken, and the metrology data collected is generally analyzed to identify a departure from the stable condition.

The present invention is directed to overcoming, or at least reducing the effects of, one or more of the problems set forth above.

SUMMARY OF THE INVENTION

One aspect of the present invention is seen in a method for adaptive sampling based on process covariance. The method includes processing a plurality of workpieces to form at least one feature on each workpiece. A plurality of characteristics of the feature is measured. A covariance matrix including diagonal and non-diagonal terms for the plurality of characteristics measured is constructed. At least the non-diagonal terms of the covariance matrix are monitored. A sampling plan for measuring the workpieces is determined based on the monitoring.

Another aspect of the present invention is seen in system including a plurality of tools, at least one metrology tool, and a sampling controller. The tools are configured to process a plurality of workpieces to form at least one feature on each workpiece. The metrology tool is configured to measure a plurality of characteristics of the feature. The sampling controller is configured to construct a covariance matrix including diagonal and non-diagonal terms for the plurality of characteristics measured, monitor at least the non-diagonal terms of the covariance matrix, and determine a sampling plan for measuring the workpieces based on the monitoring.

BRIEF DESCRIPTION OF THE DRAWINGS

The invention may be understood by reference to the following description taken in conjunction with the accompanying drawings, in which like reference numerals identify like elements, and in which.

Figure 1:
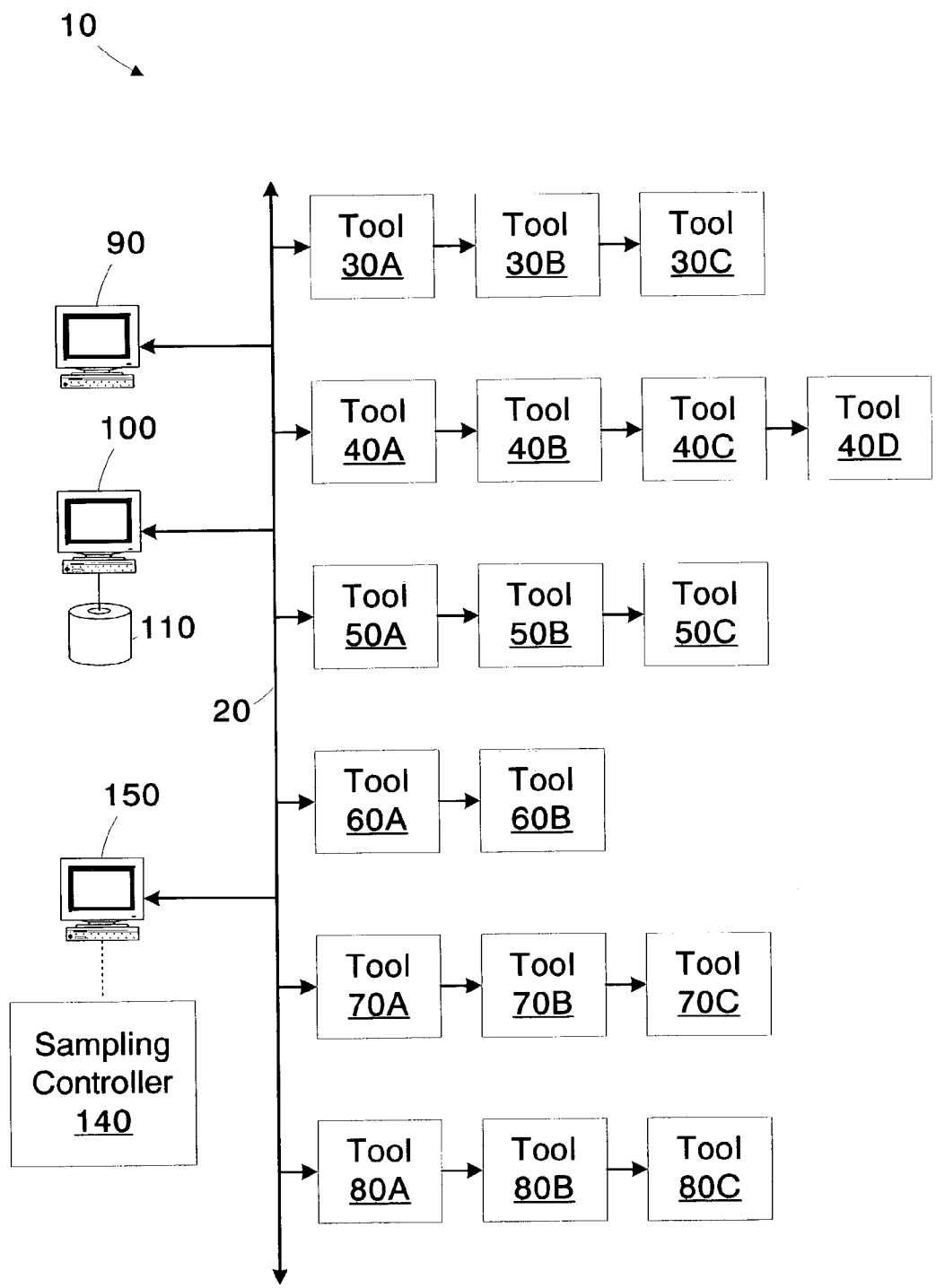
FIG. 1 is a simplified block diagram of a manufacturing system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items including, but not limited to microprocessors, memory devices, digital signal processors, application specific integrated circuits (ASICs), or other similar devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30–80. Each of the tools 30–80 may be coupled to a computer (not shown) for interfacing with the network 20. The tools 30–80 are grouped into sets of like tools, as denoted by lettered suffixes. For example, the set of tools 30A–30C represent tools of a certain type, such as a chemical mechanical planarization tool. A particular wafer or lot of wafers progresses through the tools 30–80 as it is being manufactured, with each tool 30–80 performing a specific process or metrology function in the process flow. Exemplary tools for a semiconductor device fabrication environment, include metrology tools, photolithography steppers, etch tools, deposition tools, polishing tools, rapid thermal processing tools, implantation tools, etc. The tools 30–80 are illustrated in a rank and file grouping for illustrative purposes only. In an actual implementation, the tools may be arranged in any order or grouping. Additionally, the connections between the tools in a particular grouping are meant to represent only connections to the network 20, rather than interconnections between the tools.

A manufacturing execution system (MES) server 90 directs the high level operation of the manufacturing system 10. The MES server 90 monitors the status of the various entities in the manufacturing system 10 (i.e., lots, tools 30–80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The MES server 90 stores metrology data related to the particular tools 30–80 used to process each lot of wafers in the data store 110. The metrology data may include feature measurements, process layer thicknesses, electrical performance characteristics, defect measurements, surface profiles, etc.

The manufacturing system 10 also includes a sampling controller 140 executing on a workstation 150. As described in greater detail below, the sampling controller 140 performs a covariance analysis on the metrology data to identify process deviations and implement different sampling plans for measuring the output characteristics of the workpieces processed by the tools 30–80. Although the MES server 90 and sampling controller 140 are shown as separate entities, they may be integrated into a single unit.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The distribution of the processing and data storage functions amongst the different computers or workstations in FIG. 1 is generally conducted to provide independence and central information storage. Of course, different numbers of computers and different arrangements may be used.

The sampling controller 140 monitors a plurality of parameters associated with a feature formed on the wafer. The application of the present invention is illustrated in the context of a transistor employed in a flash memory cell. However, the invention is not limited to this particular implementation, nor is it limited to a semiconductor device. Exemplary parameters that may be monitored for a flash memory cell transistor are:

1. Initial threshold voltage ($V_{t,i}$);
2. Floating gate threshold voltage after programming;
3. Floating gate threshold voltage after a short erase time;
4. Floating gate threshold voltage after an extended erase time;
5. Oxide-Nitride-Oxide (ONO) breakdown voltage;
6. Polygate resistance;
7. Tunnel oxide area;
8. Tunnel oxide resistance;
9. Tunnel oxide thickness;
10. Tunnel oxide capacitance;
11. Core saturation threshold voltage top;
12. Core saturation threshold voltage—bottom;
13. Core saturation current—top; and
14. Core saturation current—bottom.

The list of transistor parameters is intended to be illustrative and not exhaustive or limiting to the application of the present invention. Many other parameters for a flash memory cell transistor may be included in the list.

The sampling controller 140 constructs a covariance matrix for the monitored parameters, as shown below in Equation 1. Techniques for generating and updating covariance matrices as data is received for a process or processes are well known to those of ordinary skill in the art. For example, a technique for recursively estimating covariance is described in "Recursive PCA for Adaptive Process Monitoring," Li et al., *J. Proc. Cont.* 10, pp 471–486, 2000, incorporated herein by reference in its entirety. The diagonal terms of the covariance matrix each represent the variance of a single variable, while the non-diagonal terms each represent relationships between two variables (i.e., covariance). For example, if a change in variable 2 typically corresponds to a change in variable 1, the covariance terms for variables 1 and 2 would approach the same value, while if the variable were independent, the covariance terms would approach 0.

$$C = \begin{bmatrix} c_{1,1} & c_{1,2} & c_{1,3} & c_{1,4} & \cdots & c_{1,13} & c_{1,14} \\ c_{2,1} & c_{2,2} & c_{2,3} & c_{2,4} & \cdots & c_{2,13} & c_{2,14} \\ c_{3,1} & c_{3,2} & c_{3,3} & c_{3,4} & \cdots & c_{3,13} & c_{3,14} \\ c_{4,1} & c_{4,2} & c_{4,3} & c_{4,4} & \cdots & c_{4,13} & c_{4,14} \\ \vdots & \vdots & \vdots & \vdots & \ddots & \vdots & \vdots \\ c_{13,1} & c_{13,2} & c_{13,3} & c_{13,4} & \cdots & c_{13,13} & c_{13,14} \\ c_{14,1} & c_{14,2} & c_{14,3} & c_{14,4} & \cdots & c_{14,13} & c_{14,14} \end{bmatrix} \quad (1)$$

There are various techniques the sampling controller 140 may use to determine when to implement sampling plan changes based on the observed covariance changes. In a first embodiment, the sampling controller 140 may establish thresholds for selected non-diagonal covariance terms. If one or more of the thresholds is crossed, the sampling controller may increase the sampling frequency. In a second embodiment, the sampling controller 140 may monitor trends of selected non-diagonal covariance terms and implement sampling frequency changes responsive to identifying an increasing or decreasing trend.

In a third embodiment, the sampling controller 140 may watch for cases where the incoming data does not fit the structure of the covariance matrix for historical process runs. For example, the covariance matrix may indicate that two variables are related (covariance nearly equivalent). For an incoming device or series of devices, the metrology data may indicate that the relationship between the two variables for the incoming device(s) does not correspond to this historical relationship. This is commonly referred to a break in the covariance structure. Such a break may be indicative of a problem with the particular device measured. In such a case, the sampling controller 140 may flag the wafer or lot associated with the break in the covariance structure for additional metrology and/or a fault detection analysis.

In a fourth embodiment, the sampling controller 140 may compute the singlular value decomposition (SVD) of the covariance matrix and adjust the sampling frequency (SF) as a function of the singular value(s):

$$SF = f(SVD) \quad (2).$$

In some embodiments, the sampling frequency may be a linear function of the SVD, while in other embodiments, a non-linear function may be employed. Techniques for determining the singular value(s) are well known to those of ordinary skill in the art.

The sampling controller 140 determines a sampling plan for the metrology tools, (e.g., selected from the tools 30–80) based on the covariance matrix analysis. If the covariance matrix analysis indicate a relatively stable process, the sampling plan may call for a reduced number of wafers to be measured by the metrology tools. On the other hand, if the stability of the process is less clear, the sampling controller 140 may institute a sampling plan that calls for increased gathering of metrology feedback data.

In another embodiment, the sampling controller 140 may determine a different sampling plan depending on the type of instability observed. For example, for covariance deviations associated with general trends in the process stability (e.g., covariance term trend), the baseline sampling frequency may be reduced or increased. For other cases, where the covariance deviation is associated with a likely fault condition for a specific lot/wafer (e.g., break in covariance structure), a sampling plan may be implemented that designates a heightened level of metrology for the particular lot/wafer. The specific detail for the sampling plans may be developed based on historical data collected regarding the relationship between variations in the covariance matrix and the stability of the process.

Figure 2:
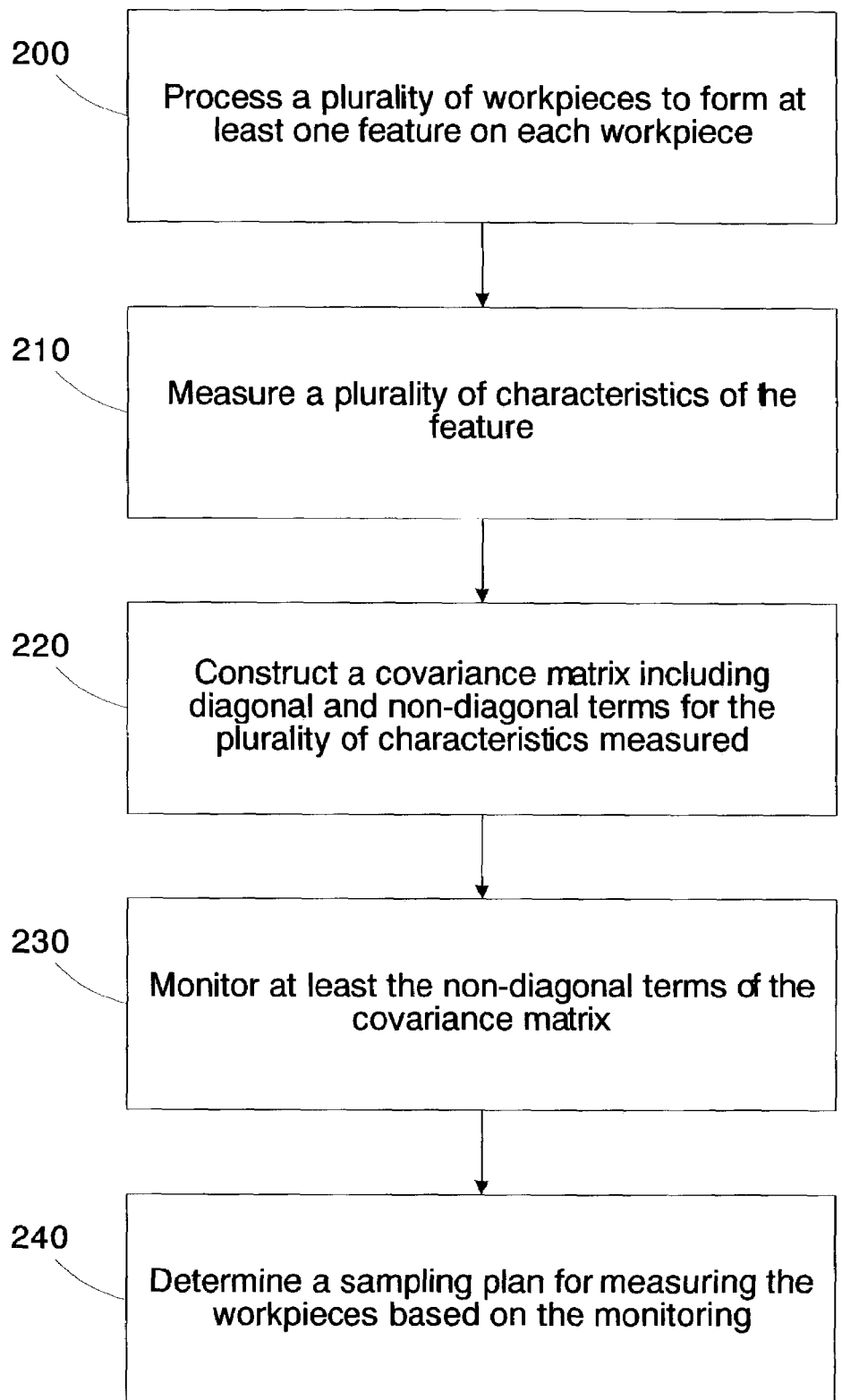
FIG. 2 is a flow diagram of a method for determining a sampling plan based on process covariance in accordance with another illustrative embodiment of the present invention.

Turning now to FIG. 2, a flow diagram of a method for determining a sampling plan in accordance with another illustrative embodiment of the present invention is provided. In block 200, a plurality of workpieces is processed to form at least one feature on each workpiece. In block 210, a plurality of characteristics of the feature is measured. In block 220, a covariance matrix is constructed for the plurality of characteristics measured. The covariance matrix includes diagonal and non-diagonal terms. In block 230, at least the non-diagonal terms of the covariance matrix are monitored. In block 240, a sampling plan is determined for measuring the workpieces based on the monitoring.

In general, adaptively changing the sampling plan as described above increases the efficiency of the manufacturing system 10. For stable processes, the amount of metrology resources expended may be reduced. This reduction increases the throughput of the manufacturing system 10. In situations where the process is less stable, the amount of metrology data collected may be increased to facilitate better process control and/or fault detection and correction.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   processing a plurality of workpieces to form at least one feature on each workpiece;
   measuring a plurality of characteristics of the feature;
   constructing a covariance matrix including diagonal and non-diagonal terms for the plurality of characteristics measured;
   monitoring at least the non-diagonal terms of the covariance matrix; and
   determining a sampling plan for measuring the workpieces based on the monitoring.

2. The method of claim 1, wherein monitoring the non-diagonal terms of the covariance matrix further comprises determining that at least one of the non-diagonal terms has crossed a predetermined threshold.

3. The method of claim 1, wherein monitoring the non-diagonal terms of the covariance matrix further comprises identifying a trend in at least one of the non-diagonal terms.

4. The method of claim 1, wherein monitoring the non-diagonal terms of the covariance matrix further comprises:
   receiving measurements of the characteristics of the feature on a current workpiece;
   identifying relationships between the measurements of the characteristics for the current workpiece;
   comparing the identified relationships to relationships present in the covariance matrix as defined by the non-diagonal terms; and
   identifying a mismatch between the relationships for the measurements of the characteristics for the current workpiece and the relationships present in the covariance matrix.

5. The method of claim 1, wherein monitoring the non-diagonal terms of the covariance matrix further comprises calculating at least one singular value for the covariance matrix, and determining the sampling plan further comprises determining a sampling frequency of the sampling plan as a function of the singular value.

6. The method of claim 5, wherein determining the sampling plan further comprises determining the sampling frequency as a multiple of the singular value.

7. The method of claim 1, wherein determining the sampling plan further comprises determining a sampling plan for subsequently processed workpieces.

8. The method of claim 1, wherein monitoring the non-diagonal terms of the covariance matrix further comprises identifying a disturbance in the covariance matrix, and determining the sampling plan further comprises associating a particular workpiece with a deviation in the covariance matrix and determining a sampling plan for the particular workpiece.

9. The method of claim 1, wherein determining the sampling plan further comprises determining a sampling frequency based on the monitoring.

10. The method of claim 1, wherein determining the sampling plan further comprises selecting a particular workpiece for subsequent metrology collection based on the monitoring.

11. A system, comprising:
    a plurality of tools configured to process a plurality of workpieces to form at least one feature on each workpiece;
    at least one metrology tool configured to measure a plurality of characteristics of the feature;
    a sampling controller configured to construct a covariance matrix including diagonal and non-diagonal terms for the plurality of characteristics measured, monitor at least the non-diagonal terms of the covariance matrix, and determine a sampling plan for measuring the workpieces based on the monitoring.

12. The system of claim 11, wherein the sampling controller is further configured to monitor the non-diagonal terms of the covariance matrix by determining that at least one of the non-diagonal terms has crossed a predetermined threshold.

13. The system of claim 11, wherein the sampling controller is further configured to monitor the non-diagonal terms of the covariance matrix by identifying a trend in at least one of the non-diagonal terms.

14. The system of claim 11, wherein the sampling controller is further configured to monitor the non-diagonal terms of the covariance matrix by receiving measurements of the characteristics of the feature on a current workpiece, identifying relationships between the measurements of the characteristics for the current workpiece, comparing the identified relationships to relationships present in the covariance matrix as defined by the non-diagonal terms, and identifying a mismatch between the relationships for the measurements of the characteristics for the current workpiece and the relationships present in the covariance matrix.

15. The system of claim 11, wherein the sampling controller is further configured to calculate at least one singular value for the covariance matrix and determine a sampling frequency of the sampling plan as a function of the singular value.

16. The system of claim 11, wherein the sampling controller is further configured to determine the sampling frequency as a multiple of the singular value.

17. The system of claim 11, wherein the sampling controller is further configured to determine a sampling plan for subsequently processed workpieces.

18. The system of claim 11, wherein the sampling controller is further configured to identify a disturbance in the covariance matrix, associate a particular workpiece with a deviation in the covariance matrix, and determine a sampling plan for the particular workpiece.

19. The system of claim 11, wherein the sampling controller is further configured to determine a sampling frequency based on the monitoring.

20. The system of claim 11, wherein the sampling controller is further configured to select a particular workpiece for subsequent metrology collection.

21. A system, comprising:
    means for processing a plurality of workpieces to form at least one feature on each workpiece;
    means for measuring a plurality of characteristics of the feature;
    means for constructing a covariance matrix including diagonal and non-diagonal terms for the plurality of characteristics measured;
    means for monitoring at least the non-diagonal terms of the covariance matrix; and
    means for determining a sampling plan for measuring the workpieces based on the monitoring.

* * * * *